United States Patent [19]

Tonogai

[11] Patent Number: 5,092,685
[45] Date of Patent: Mar. 3, 1992

[54] SEALING STRUCTURE FOR LINEAR MOTION BEARING

[75] Inventor: Mitsuyasu Tonogai, Nara, Japan

[73] Assignee: Tsubakimoto Precision Products Co. Ltd., Osaka, Japan

[21] Appl. No.: 588,982

[22] Filed: Sep. 26, 1990

[51] Int. Cl.⁵ .............................................. F16C 31/06
[52] U.S. Cl. ........................................ 384/15; 384/45
[58] Field of Search ...................... 384/15, 45, 43, 44; 464/168

[56] References Cited

U.S. PATENT DOCUMENTS

| | | | |
|---|---|---|---|
| 2,548,848 | 4/1951 | Stechmann | 384/15 |
| 2,951,728 | 9/1960 | Drake | 384/15 |
| 4,927,272 | 5/1990 | Ward | 384/45 |

Primary Examiner—Lenard A. Footland
Attorney, Agent, or Firm—Howson & Howson

[57] ABSTRACT

A sealing structure for preventing entry of foreign matter or lubricant leakage in the gaps formed between a linear motion bearing assembly movable along the length of a rail base. An elastic seal includes an end portion retained at the junction of the ends of the assembly with the rail base, and connecting portions integrally formed with the end portions at the junction of the sides of the assembly with the rail base. The inner periphery of the seal is slightly smaller than the periphery of the rail base to provide a positive seal. The ends of the assembly include stepped portions with inner peripheries slightly larger than the outer periphery of the end portions to permit the sealing structure to self-position above the rail base.

8 Claims, 4 Drawing Sheets

SEALING STRUCTURE FOR LINEAR MOTION BEARING

FIELD OF THE INVENTION

The present invention relates to a sealing structure for sealing gaps between a bearing assembly of a linear motion bearing and a rail base.

BACKGROUND OF THE INVENTION

A linear motion bearing is a bearing to be used for guiding a linear motion part of a table or a positioning table of a machine tool, for example.

In such a bearing, there are defined between the bearing assembly and the rail base axial gaps, that is, gaps between opposite end surfaces of the bearing assembly and the rail base and transverse gaps, that is, gaps between side surfaces of the rail base and the bearing assembly. To prevent entry of a foreign matter such as dust from the gaps and also prevent leakage of a lubricant from the bearing assembly, a sealing structure is normally provided to the bearing assembly.

Such a sealing structure is known from Japanese Utility Model Publication No. 43136/1987. The known sealing structure is shown in FIGS. 5 to 7, in which a sealing structure 50 is constructed of a pair of side plates 51, a pair of connecting portions 52 and rubber 53 is fixed to the side plates 51 and connecting portions 52. The sealing structure 50 having this construction is mounted to the bearing assembly to thereby prevent the entry of a foreign matter and the leakage of a lubricant.

However, the sealing structure 50 is manufactured by first pressing a planar plate, then putting the rubber by baking to the plate, and finally bending the plate with the rubber. Thus, a rubber baking step is included in a machining operation to render a total step complicated and increase a manufacturing cost.

Further, when the sealing structure 50 is fixed to the bearing assembly, a fixing position of the sealing structure 50 must be adjusted so as to suitably fit a sealing lip to the rail base.

SUMMARY OF THE INVENTION

According to the present invention, the above problems are solved by a sealing structure for a linear motion bearing, characterized in that a seal member for sealing axial gaps and transverse gaps between a bearing assembly of said linear motion bearing and a rail base is integrally formed, and that said seal member is mounted to said bearing assembly by a retainer plate provided separately from said seal member.

Since the seal member of the present invention is separated from the retainer plate, they may be manufactured in individual steps, and may be easily mounted to the bearing assembly by means of fixing means such as bolts or screws to thereby construct the seal member.

DESCRIPTION OF THE PREFERRED EMBODIMENT

There will now be described an embodiment of the present invention with reference to the drawings.

Figure 1:
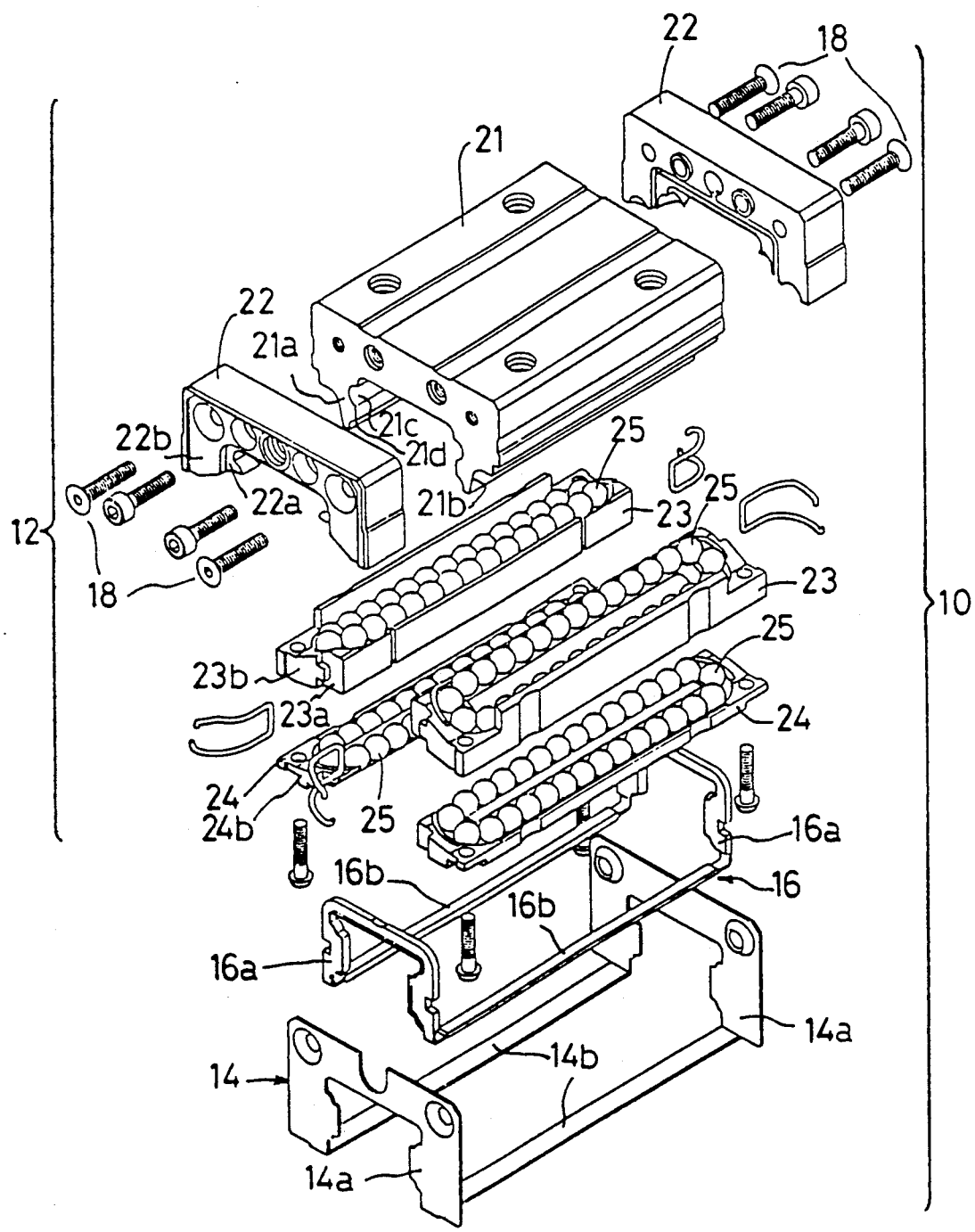
FIG. 1 is an exploded perspective view of the linear motion bearing in the preferred embodiment of the present invention.

FIG. 1 is an exploded perspective view of a linear motion bearing 10 (a rail base is not shown) to which the present invention is applied. The linear motion bearing 10 is comprised of a bearing assembly 12, a seal retainer plate 14 and a seal member 16. The seal retainer plate 14 is mounted together with the seal member 16 to the bearing assembly 12 by means of bolts 18.

The bearing assembly 12 is comprised of a bearing body 21, a pair of upper members 22, a pair of intermediate members 23, a pair of lower members 24 and a plurality of rolling elements 25. In the embodiment, the rolling elements 25 are balls. However, they may be replaced by rollers.

The bearing body 21 has a pair of leg portions 21a. Each of the leg portions 21a is formed with a pair of corner portions 21b and an upper loaded ball groove 21c for forming an upper ball circulation path, and with a lower loaded ball groove 21d for forming a lower ball circulation path. A lower surface of each upper member 22 is formed with a U-shaped ball turning path having a semi-circular cross section for connecting the corner portions 21b with the upper loaded ball grooves 21c of the bearing body 21. An upper surface of each lower member 24 is formed with a couple of J-shaped grooves opposed to each other at their ends for forming the lower ball circulation path, and with a ball retainer groove connecting the other ends of the J-shaped grooves. An upper surface of each of the intermediate members 23 interposed between the upper members 22 and the lower members 24 is formed with a couple of J-shaped grooves opposed to each other at their ends for forming the upper ball circulation path in cooperation with the bearing body 21 and the upper members 22, and with a ball retainer groove connecting the other ends of the J-shaped grooves. A lower surface of each intermediate member 23 is formed with a couple of J-shaped grooves opposed to each other at their ends for forming the lower ball circulation path in cooperation with the lower member 24, and with a ball retainer groove connecting the other ends of the J-shaped grooves. The balls 25 are accommodated in the upper and lower ball circulation paths, thus constructing the bearing assembly 12.

The structure of such a linear motion bearing itself is not essential in the present invention, and it is explained in detail in Japanese Patent Application No. 162600/1988. Therefore, further detailed explanation of the structure will be omitted hereinafter.

Figure 2:
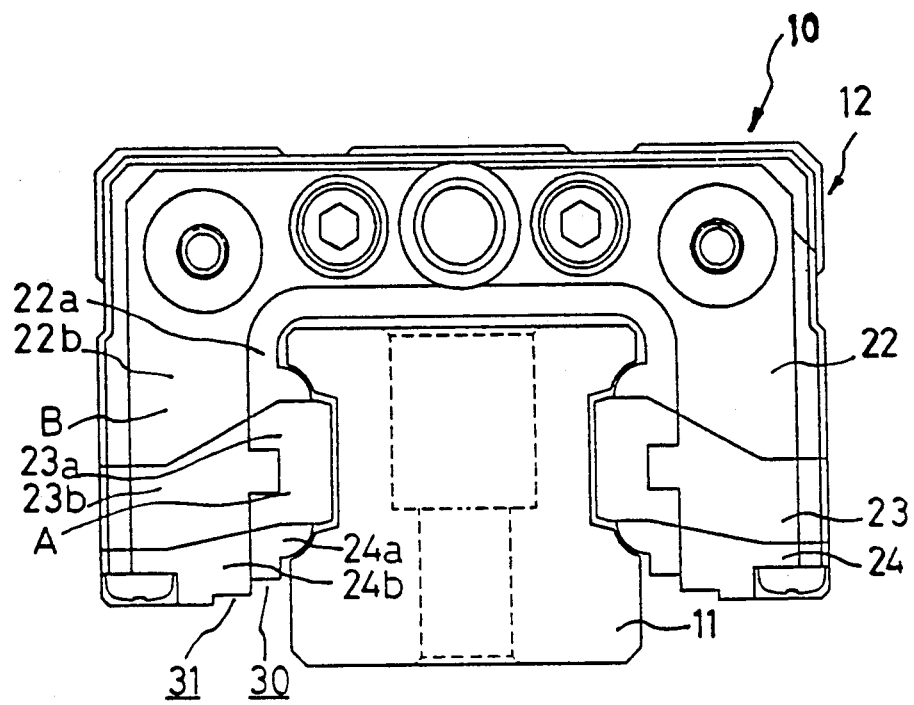
FIG. 2 is an elevational view of the bearing assembly mounted on the rail base.

Each upper member 22 is formed at its outer ends with stepped portions 22a and 22b. Each intermediate member 23 is formed at its each end with stepped portions 23a and 23b. Each lower member 24 is formed at its each end with stepped portions 24a and 24b. When the members are assembled as shown in FIG. 2, the stepped portions 22a, 23a and 24a are made flush with each other to form a stepped portion A for receiving an end plate portion 16a of the seal member 16 which will be hereinafter described. Similarly, the stepped portions 22b, 23b and 24b are made flush with each other to form a stepped portion B for receiving an end plate portion 14a of the retainer plate 14 which will be also described hereinafter.

Further, each lower member 24 is formed at its lower portion with a stepped portion 30 for receiving a longitudinal connecting portion 16b of the seal member 16 to be hereinafter described and with a stepped portion 31 for receiving a longitudinal bottom portion 14b of the retainer plate 14.

Thus, the seal member 16 is engaged with the stepped portions A and 30, and the retainer plate 14 is engaged with the stepped portions B and 31 to thereby construct the bearing assembly 12.

FIG. 2 shows a condition where the bearing assembly 12 is constructed to be mounted on a rail base 11 to form the linear motion bearing 10. As shown in FIG. 2, there are defined gaps in an axial direction (i.e., direction of linear motion) and in a transverse direction between the bearing assembly 12 and the rail base 11. The seal member 16 is integrally formed with a pair of end plate portions 16a for sealing the gaps in the axial direction and a pair of longitudinal connecting portions 16b for sealing the gaps in the transverse direction.

The seal member 16 has a shape suitable for sealing all the gaps mentioned above, and it is preferably formed of plastics. However, it may be formed of rubber, felt, etc. The seal member 16 has a size and a shape such that it can be slightly moved in the stepped portions 30 and A. In other words, the stepped portions 30 and A have sizes and shapes allowing slight movement of the seal member 16.

Figure 3:
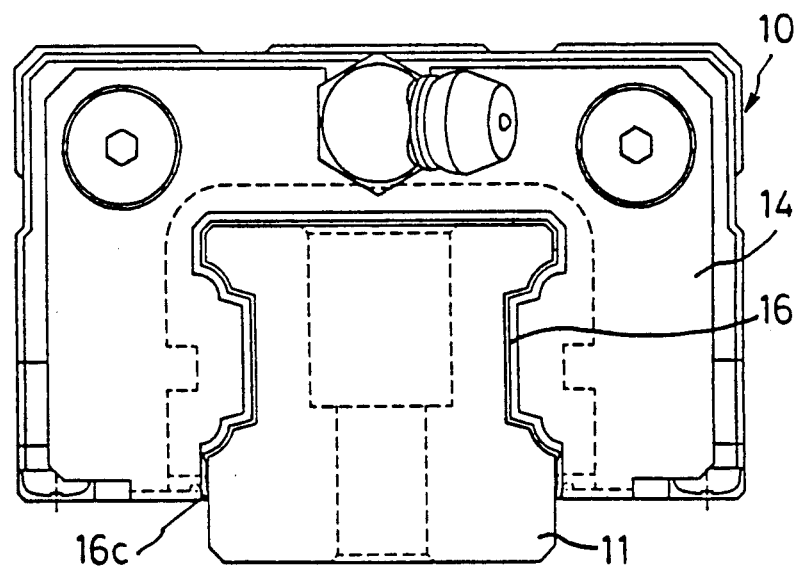
FIG. 3 is an elevational view of the sealing structure mounted to the bearing assembly.

Accordingly, even after the retainer plate 14 is mounted to the bearing assembly 12 by means of the bolts 18, the movement of the seal member 16 is not completely restrained. Furthermore, an inner periphery of each end plate portion 16a is formed to be slightly smaller than an outer periphery of the rail base 11, so that the rail base 11 is gripped by the seal member 16 owing to its elasticity and a gripping force of the seal member 16 is uniformly applied to the rail base 11 to thereby reliably seal the gaps in the axial direction. Furthermore, as shown in FIG. 3, the seal member 16 is formed with a pair of lips 16c for sealing the gaps in the transverse direction.

The retainer plate 14 is normally formed of metal to not only retain the seal member 16 but also protect the same. Conventionally, such a retainer plate is obliged to employ a material having an elastically deformable amount such as rubber because the plate is bent in the last working step. However, according to the present invention, the seal member 16 is formed independently of the retainer plate 14. That is, the retainer plate 14 is independently manufactured without a completely different intermediate step such as a rubber fixing step. Accordingly, the seal member 16 may also be independently manufactured. Finally, it is necessary to merely mount the seal member 16 and the retainer plate 14 to the bearing assembly 12. In this manner, the number of manufacturing steps of the seal member 16 and the retainer plate 14 can be greatly reduced. In this connection, the seal member 16 can be formed of a wide variety of materials. In case of employing plastics for the material, the seal member 16 can be formed by once carrying out injection molding. Further, a molding accuracy of plastics can be improved more than that of a rubber material. This advantage is exhibited particularly remarkably at the lips 16c.

As mentioned above, when the seal member 16 is accommodated in the stepped portions 30 and A, slight movement of the seal member 16 is permitted even after the retainer plate 14 is mounted to the bearing assembly 12. Therefore, the seal member 16 can be moved by itself to a suitable position by merely engaging the same into the stepped portions 30 and A. Accordingly, there will be no change to the sealing force in the axial and transverse directions, and uniform contact of the lips 16c with the rail base 11 is ensured, thus eliminating the need of troublesome adjustment upon mounting of the retainer plate 14.

Figure 4:
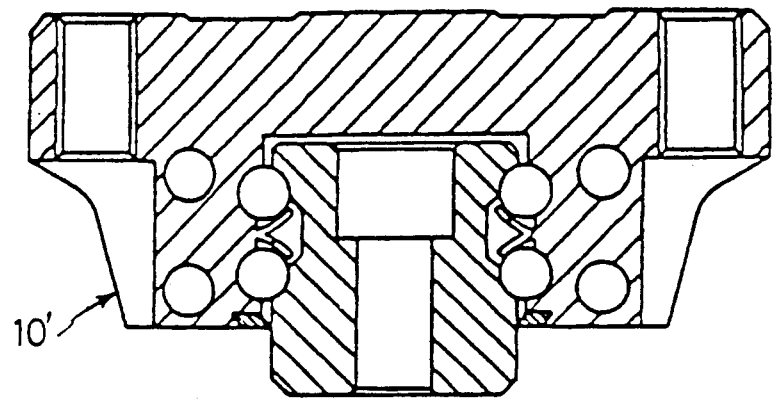
FIG. 4 is a sectional view of another linear motion bearing in the prior art.
Figure 5:
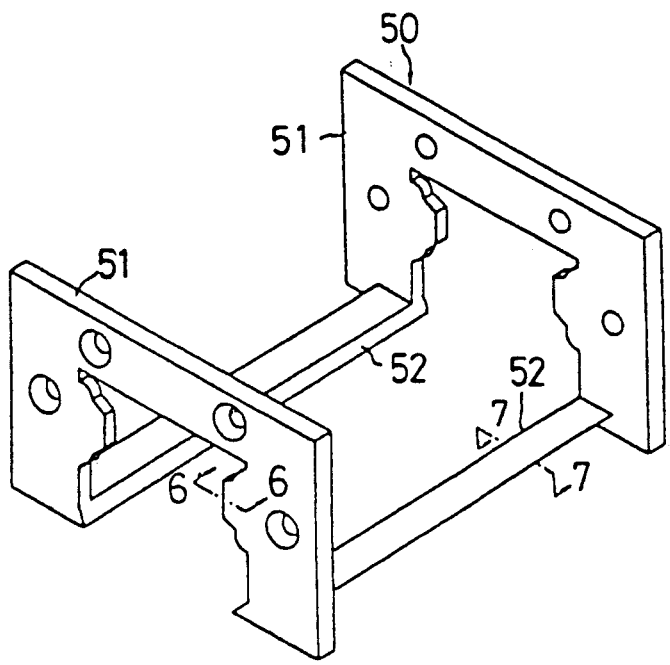
FIG. 5 is a perspective view of the sealing structure in the prior art.
Figure 6:
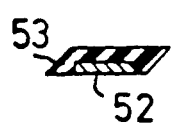
FIG. 6 is a cross section taken along the line 6—6 in FIG. 5.
Figure 7:
FIG. 7 is a cross section taken along the line 7—7 in FIG. 5.

Although the sealing structure in the above embodiment is applied to the liner motion bearing constituted of the bearing body, the upper members, the intermediate members and the lower members, it will be appreciated that the application of the present invention is not limited to such a linear motion bearing. For instance, the present invention can be of course applied to a liner motion bearing 10' having a general structure as shown in FIG. 4. In this case, opposite end surfaces of return caps and lower surfaces of leg portions of the bearing body are formed with stepped portions for receiving the seal member.

Advantages of the Invention

According to the present invention as described above, the seal member and the retainer plate are formed as separate members. Accordingly, manufacturing and assembling costs can be reduced. Further, the seal member can be manufactured with a high accuracy.

The seal member can be moved to some extent to a proper position with respect to the rail base without being restrained between the bearing assembly and the retainer plate. Accordingly, troublesome adjustment of the seal member upon mounting of the retainer plate can be eliminated, and the sealing function of the seal member with respect to the rail base can be improved.

I claim:

1. A sealing structure for sealing in the axial and transverse directions gaps between a linear motion bearing assembly, and a rail base, the bearing assembly having longitudinally disposed members straddling the rail base, said structure comprising:
a seal member disposed at the ends and sides of the bearing assembly and integrally formed for mounting to said bearing assembly by a retainer plate provided separately from said seal member.

2. The sealing structure as defined in claim 1 wherein said seal member is accommodated in stepped portions at the ends of the bearing assembly with sufficient clearance between said bearing assembly and said retainer plate for permitting self-positioning relative to the rail base.

3. The sealing structure of claim 1 wherein the inner periphery of said seal member is slightly narrower than the corresponding profile of the rail base.

4. Apparatus according to claim 3, further comprising:
deformable retainer means having a pair of end plates disposed on the distal sides of said end portions for retaining said end portions at the ends of the bearing assembly, and a pair of connecting members integrally formed between said end plates for retaining said connecting portions along the length of the rolling members.

5. Apparatus according to claim 3 further comprising:
first and second stepped portions formed in the ends of the bearing assembly for receiving one each of said end portions and said end plates, respectively.

6. The sealing structure of claim 1 wherein said seal member has a sealing lip means bearing against the rail base for providing a continuous seal therewith.

7. Apparatus according to claim 6 further comprising:
third and fourth stepped portions formed in each bearing member for receiving one each of said connecting portions and said connecting members, respectively.

8. Apparatus for sealing gaps formed between a linear motion bearing assembly movable along the length of a rail base, the bearing assembly having laterally disposed rolling members engaging the opposite sides of the rail base, said apparatus comprising:
elastic seal means having a pair of end portions formed to fit against longitudinally spaced ends of the bearing assembly and adjacent to the rail base, and a pair of laterally spaced connecting portions formed as a unit between said end portions to fit against the rolling members and adjacent to the rail base, said end portions and said connecting portions having an inner periphery slightly smaller than the periphery of the rail base for providing a continuous seal therebetween.

* * * * *